Nov. 3, 1959 H. HAPP ET AL 2,910,843
RESILIENT ROTARY CONNECTIONS FOR DRIVE SHAFTS
Filed April 12, 1957 2 Sheets-Sheet 1
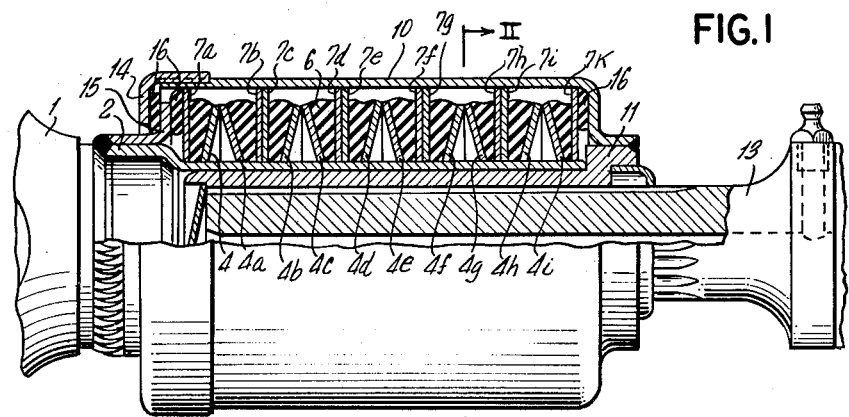
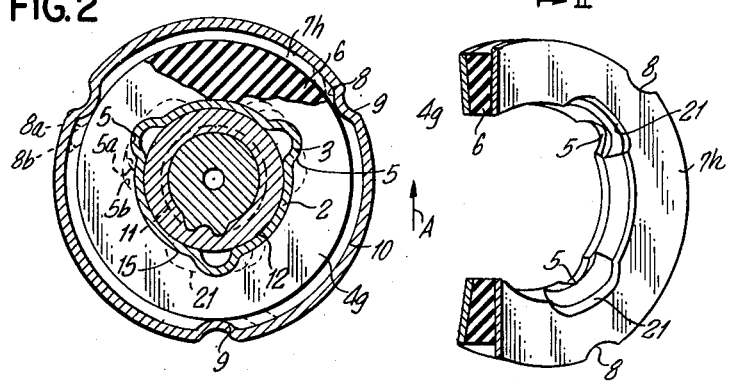
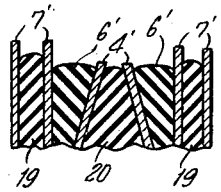
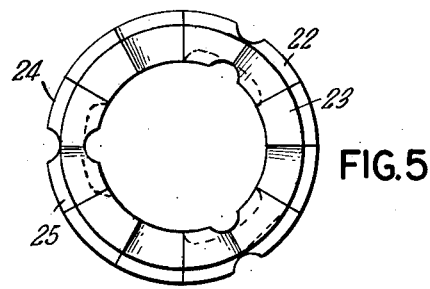
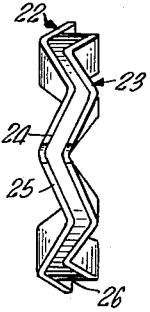
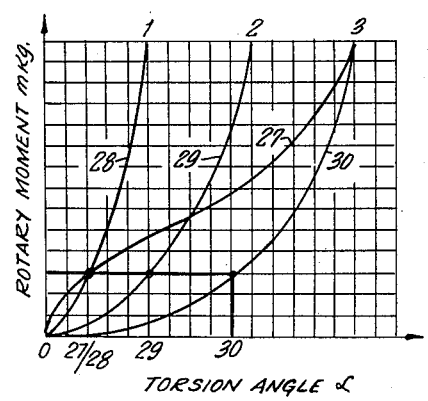
INVENTORS
HERMAN HAPP
HELMUT HARTZ
By Kurt Kelman
their AGENT

2,910,843

RESILIENT ROTARY CONNECTIONS FOR DRIVE SHAFTS

Hermann Happ, Frankfurt am Main, and Helmut Hartz, Wanne-Eickel, Germany

Application April 12, 1957, Serial No. 652,390

Claims priority, application Germany April 14, 1956

12 Claims. (Cl. 64—11)

The present invention relates to improvements in resilient rotary connections between the joints of a drive shaft, particularly for motor vehicles.

For cushioning rotary impacts in driving mechanisms, for example, for motor vehicles, it is already known to provide resilient rotary shaft connections consisting of two parts which are provided between the joints of a drive shaft.

It has been customary to provide two joints in order to balance the irregularities in the rotary movement of the drive shaft, which occur if only one joint is used, by means of a second joint having the same angle of deflection as the first joint. However, the irregularities in the rotary movement of the masses rotating between the joints cannot thus be avoided. Such irregularities lead, however, to undesirable inherent or natural vibrations because of accelerating and retarding forces which, during each rotation, reach twice a maximum and twice a minimum value.

It has then been attempted to overcome this disadvantage by providing rotary resilient joints in the form of homokinetic joints. However, such joints have the disadvantage that the impacts produced by the angles of deviation which are to be transmitted must be taken up by the resilient means. Since the frequency of load reversals corresponds to twice the rate of speed, even the normal speed of motor vehicles easily results in a destruction of the resilient means by an accumulation of heat.

There are other known types of resilient shaft connections which are designed to withstand a rotary thrust and have a two-part resilient rotary connection between the joints, in which one part forms an inner shaft and the other a hollow shaft surrounding the first, and wherein a resilient element is provided between the two shafts which connects these shafts either by friction or by being vulcanized thereto.

The resilient element of such a shaft connection consists, for example, of a plurality of rubber rings disposed coaxially, one behind the other, which are successively inserted between the shafts under tension and serve the purpose of transmitting the rotary forces by friction to the outer surfaces.

However, since in such shaft connections only the outer surfaces surrounding the resilient means can be utilized for transmitting the rotary forces, the resilient means must have very large dimensions which, in turn, means that the moments of inertia arising between the joints because of the accelerating and retarding forces will be considerably increased.

Such increase in the diameter of the resilient bodies, however, not only means an increase of the moments of inertia ($GD^2$) of the drive shaft, and therefore an increase in the frequency of the natural rotary vibrations, but it also requires thicker layers of rubber in order to attain equal angles of rotation at equal tangential stresses upon the resilient means. This, in turn, means a progressive increase of the masses producing the vibrations, which results in disagreeable noise, early wear and tear, and built-up vibrations in the resiliently mounted motors and gears.

It is an object of the present invention to provide a resilient shaft connection which avoids the above-mentioned disadvantages of resilient connections as known in the art by means of a novel arrangement of a resilient element which is capable of taking up tangential stresses and is inserted between the joints of a drive shaft.

Another object of the invention is to provide a resilient shaft connection in which the moments of inertia occurring according to the Cardanic principle between the joints of a drive shaft are made as small as possible, and in which the resilient elements have a very small weight.

Another object of the invention is to insure a perfect centering of the shaft connection even when rotating at very high speeds.

These and other objects of the invention are attained by the provision of a shaft connection consisting of three parts connecting two joints of a drive shaft with a hollow shaft and an inner shaft sliding into said hollow shaft and having either internal teeth or forming a splined shaft, and resilient means disposed between these two shafts. This new shaft connection is designed so that, in order to prevent lateral vibrations, the inner shaft is guided along its entire length within the hollow shaft. The inner shaft is also connected to a bushing or sleeve which surrounds the shaft concentrically thereto and is open toward the side from which the shaft is inserted. After the hollow shaft has been slipped over the inner shaft, this sleeve, together with the hollow shaft, encloses a cylindrical space which is adapted to receive the resilient means. It is further advisable according to the invention to provide a coating of polyamide between the central shaft and the hollow shaft, for example, by applying the same to the respective surfaces by immersion and heating or by spraying. Such coating will counteract the resonance of the hollow shaft and properly center the same along its entire length on the central shaft without requiring any special service during the operation. The resilient means preferably consist of cylinders or annular disks, of, for example, natural or synthetic rubber or other resilient synthetic materials, which are inserted into the mentioned cylindrical space. In order to attain the largest possible contact surfaces for transmitting the rotary forces even though the resilient elements are relatively small, annular metal disks or rings are interposed between the adjacent resilient elements so that the rotary forces will be taken up by the metal rings and be transmitted thereby to the end surfaces of the resilient members disposed between them. For this purpose, the metal rings cooperate, on the one hand, with the outer surface of the hollow shaft and, on the other hand, with the mentioned sleeve on the central shaft to transmit the rotary forces thereto, for example, by means of projections on both the hollow shaft and the sleeve which turn the annular metal disks about their common axes. The individual resilient elements consisting of rubber and metal rings thus turn together against the restraining action of the resilient material.

Although the arrangement as above described considerably reduces the accelerating and retarding forces of the masses rotating unevenly between the joints, and does not possess any of the disadvantages previously mentioned, it does not as yet entirely overcome these forces. It is therefore a further object of the present invention to prevent the natural frequencies of vibration, which correspond to four times the rate of speed, from reaching the resilient means since these high-frequency vibrations might produce heat accumulation within the rubber-metal elements which might lead to destruction thereof, even at the usual rates of speed of motor vehicles.

The magnitude of the accelerating and retarding forces may be calculated according to the following formula:

$$M_b = \pm GD^2 \cdot \frac{1^2}{4g}(U.\sin^2 1 - U^2.\sin 41)$$

in which the irregularity in the rotary movement U is dependent upon the size of the masses, the rate of speed, and the angle of deflection. The irregularity is calculated as follows:

$$\frac{U = 2 \max - 2 \min}{1} = \frac{1}{\cos} - \cos = \frac{\sin^2}{\cos}$$

In order to prevent the moments of inertia determined according to the above formulas from reaching the elastic members, the present invention provides an artificial moment of friction within the resilient rotary element. This artificial frictional moment is designed to be especially adjustable in accordance to the moments of inertia occurring in each case so that the rotary resilience will not be affected more than necessary.

The embodiment of the invention as subsequently described is merely given as an example of the manner in which rotary vibrations of any size may be arrested by friction in axially slidable elements which transmit the rotary forces by means of their end surfaces. A further feature of the resilient rotary element according to the invention which is composed of three parts and provided between the joints of a drive shaft consists in that the individual resilient elements, preferably so-called rubber-metal elements, are provided, on the one hand, on the hollow shaft, and on the other hand, within the sleeve which is rigidly connected to the inner shaft, and so as to be slidable longitudinally relative to said hollow shaft and sleeve, and so as to be taken along in the peripheral direction either alternately or in pairs, and either connected in parallel or in series by means of grooves in the metal rings and by projecting ribs or the like within the sleeve and the hollow shaft.

In order to increase the stability and endurance of the rubber-metal elements, each of which consists of a pair of metal rings and a rubber disk mounted between these metal rings, and in order to increase the attainable tension angle, the individual elements are subjected to an initial tension by tightening a tension nut on the sleeve which is rigidly secured to the inner shaft. By making the resilient elements slidable in the longitudinal direction, such initial tension is distributed uniformly to each of them.

For attaining the frictional moment necessary for heavy shafts running at high speeds and with large deflection angles, the individual resilient elements which are longitudinally slidable and are held under tension by the tension nut, and which therefore together act as a single longitudinally extending spring unit, are used to produce an artificial frictional moment on the friction rings which abut against both sides of a pressure ring which is rigidly secured to the hollow shaft. For attaining this artificial frictional moment, the individual resilient elements acting as longitudinal springs press the friction rings, preferably consisting of polyamide, against the pressure ring which, since it is rigidly connected to the hollow shaft, turns relative to the outer sleeve, which is rigidly connected to the inner shaft, and to the slide rings which are taken along by the inner shaft in the peripheral direction by means of grooves, and in the direction opposite to the resilient resistance of the rubber-metal elements.

The tension nut permits frictional moment produced by the friction rings which are pressed by the tension of the individual resilient elements longitudinally against the pressure ring, to be adjustably regulated in accordance with the prevailing size of the torsional moment. For this purpose, it is advisable to adjust the artificial frictional moment so as to be only slightly larger than the prevailing accelerating and retarding forces.

While trucks, because of the larger rotary moments to be transmitted, are provided with heavy drive shafts with larger angles of deflection which, according to the above statements, require a frictional moment, passenger cars usually require only light shafts which are subject to no or only very small deflection angles. Since the above formulas show that the cause of the moments of inertia is particularly dependent upon the prevailing angles and the weight of the drive shafts, the use of the shafts in passenger cars will not produce any vibrations thereof or only vibrations of such a small magnitude that they will not lead to destruction of the resilient elements because of an accumulation of heat.

However, particularly in passenger cars, alternating forces occur in the lower range of speed and torque which have a high vibration frequency but do not constitute any natural rotary vibrations but induced vibrations of an order of magnitude which cannot lead to any destructive heat accumulation.

The great disadvantage of these alternating forces is, however, in that they will cause a noise in the gears and driving elements which is either produced by an irregular running of the driving engine or by an irregular torque transmission. It is therefore a further object of the present invention to provide a perfect solution also in these cases, and, although the natural rotary vibrations do not occur, to absorb these alternating forces as softly or resiliently as possible. The presence of a frictional moment would in these cases only unnecessarily affect the rotary resilience.

Another feature of the resilient element according to the invention is in that in those cases in which no frictional moment is to be produced the friction rings which are provided if a frictional moment is required may be replaced by resilient rotary means preferably consisting of rings of a very soft rubber which are capable of taking up very resiliently the alternating forces occurring at vibrations of a high frequency as well as the rotary vibrations occurring as a result of instantaneous changes. Although such resilient means take up these forces they are still given the necessary tension to increase their stability and endurance, as well as the attainable torsion angle. In this case, the annular resilient elements also have to take up the torsional moments of the shafts which are to be transmitted.

The friction will also be avoided by the sleevelike resilient elements which are inserted between the hollow shaft and the sleeve which is rigidly secured to the inner shaft, and which are radially compressed and thus placed under tension. In order to make the necessary adhering surfaces of such sleevelike elements, which preferably consist of three concentrical sleeves, of the smallest possible diameter, it is advisable to cover the central sleeve at both the outer and inner sides with rubber. Such element has the advantage over one consisting of only two metal sleeves that approximately twice the rotary forces may be transmitted thereby. Each of the outer and inner concentrical sleeves between which the resilient material is mounted preferably consists of three parts so as to permit the material to yield when radially compressed, and to counteract the tension caused by the radial shrinking after completion of the vulcanizing process.

In order to avoid any tension caused by longitudinal shrinking, the entire element necessary for transmitting the torsional moments is preferably subdivided in the axial direction, and the central sleeve of the individual members thus formed is preferably provided with clawlike projections at the end surfaces which engage with similar projections on the other sleeves and thus form a single unit when compressed by the tension nut.

Further objects, features, and advantages of the present invention will be apparent from the following detailed description thereof, particularly when read with reference to the accompanying drawings, in which—

Fig. 1 shows, partly in a central vertical longitudinal cross section, a general view of the shaft connection according to the invention;

Fig. 2 shows a cross section taken along line II—II of Fig. 1;

Fig. 3 shows a perspective sectional view of an individual resilient element provided with safety stops;

Fig. 4 is fragmentary sectional view of a modified composite thrust absorbing means comprising additional resilient members which are loosely inserted between the metallic rings surrounding the resilient annuli;

Fig. 5 shows in plan view a modification of an individual element;

Fig. 6 shows a side view thereof;

Fig. 7 shows a graph of the spring characteristics; and

Figure 8:
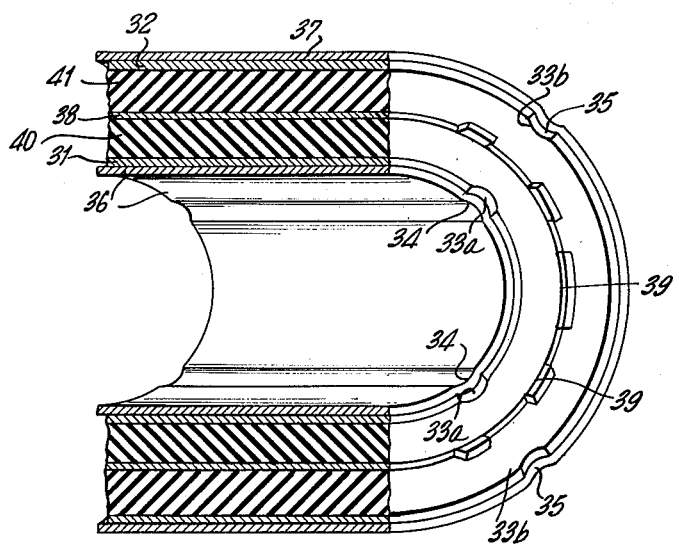
Fig. 8 is a perspective sectional view of a double-sleeve element.

Referring to the drawings, and first particularly to Figs. 1 and 3, the rotary forces received by the joint which is adapted to transmit angular deflections are transmitted by the shaft 1 to the hollow shaft 2 which is welded thereto, and then by riblike projections 3 thereon extending in the axially parallel direction, as shown in Fig. 2, to slipped-over metal rings 4—4i which have grooves 5—5b within their inner peripheral edge, as shown in Fig. 3, which are adapted to receive projections 3 on hollow shaft 2. An annular resilient member 6, consisting of rubber or a similar material is connected to each of metal rings 4—4i, and, while opposing the rotary forces transmitted thereto, further transmits these forces to metal rings 7a—7k of larger outer diameter than rings 4—4i. Rings 7a—7k are provided with grooves 8—8b along their outer peripheries which receive axially parallel inwardly projecting ribs 9, as shown in Fig. 2, formed in a cylindrical outer sleeve 10. This sleeve 10 is rigidly secured by welding to an inner tubular shaft 11 which is centrally mounted along its entire length within hollow shaft 2 and connected thereto so as to be anti-resonant and not to require any service, for example, by means of a coating 12 of polyamide. The inner shaft 11 receives the splined shaft 13 which is slidable in the longitudinal direction and transmits the rotary forces to the parts connected thereto.

A tension nut 14 which is screwed upon sleeve 10, and a pressure ring 15 with interposed friction rings 16 preferably consisting of polyamide or rubber compress the individual resilient elements so that the latter, since they are slidable in the axial direction along the longitudinally extending ribs, will each be under an equal tension.

The composite resilient unit which thus acts as a longitudinal spring exerts a pressure upon friction rings 16 on both sides of pressure ring 15, which is adjustable by tension nut 14, so that, when the resilient elements are twisted between pressure ring 15 and friction rings 16 which are taken along in the peripheral direction by ribs 9 on sleeve 10, a frictional moment will be produced because friction rings 16 turn in a direction opposite to pressure ring 15 which is secured to hollow shaft 2.

In such cases in which no natural or inherent rotary vibrations are produced in the universal-joint drive shaft and no frictional moment is therefore required for taking up high-frequency vibrations, friction rings 16 are preferably replaced by rubber rings of such thickness and degree of softness as to be able resiliently to receive any rotary vibrations which are transmitted from the outside to the drive shaft.

For taking up the axial thrust occurring when the drive shaft changes in length, the metal parts of the shaft connection rest upon each other so that, when the splined shaft moves outwardly, tension nut 14 through friction rings 16 acts upon pressure ring 15 which is rigidly secured to hollow shaft 2. When the splined shaft moves inwardly, the open end of hollow shaft 2 abuts against the flange of the inner shaft 11 so that the forces then occurring will be prevented from reaching the resilient means.

As shown in Fig. 3 and indicated in dotted lines in Fig. 2, it is advisable to prevent an overloading of the resilient shaft connection by providing enlarged grooves 21 at the inner edge of metal rings 7a—7k, the outer ends of which engage with ribs 3 on hollow shaft 2 when the torsion angle or rotary moment reaches a certain predetermined value. Any two of metal rings 4—4i and 7a—7k connected by a resilient member 6 are thus capable of twisting relative to each other to the extent of the width of grooves 21 and are again rigidly connected to each other by ribs 3 when twisted to the end of grooves 21.

Figs. 5 and 6 illustrate a modification of the resilient ring-shaped elements according to the invention. The resilient rubber member 26 is covered on both sides by metal rings 22 and 23 of a serrated shape having segmental angular surfaces extending radially outwardly like pleats. This results in a predetermined spring characteristic of a definite progresion so that, when rubber rings 26 are inserted between metal rings 22 and 23, which in this case are preferably not vulcanized thereto, and a torsion is applied, the rubber rings are at first subjected to thrust and, when the torsion angle increases, progressively to pressure. The radial forces are then increasingly converted into axial forces, and, as the axial pressure increases, friction disks 16, as shown in Fig. 1, then produce a progressively increasing friction which, in turn, progressively affects the spring characteristic.

Since the compressive load application prevailing at the end of a twisting motion between a pair of metal rings, one of which is taken along at its outer periphery and the other at the inner periphery, only permits a relatively small torsion angle to be taken up within the resilient element, it is advisable to insert additional rubber and metal rings between the metal rings which are taken along by grooves, and to arrange these additional rings without securing the same so as to be freely movable so that the torsion angles will thus be added to each other. This modification is illustrated in Fig. 4 which shows in section a portion of composite thrust absorbing means comprising pairs of metal rings 4' and 7'; annular resilient members 6' between each metal ring 4' and an adjacent ring 7'; and freely rotatable resilient rings 19, 20 disposed between pairs of rings 7' and 4', respectively. Rings 19, 20 are freely rotatable relative to adjacent pairs of rings 7', 4', respectively.

In order to attain, particularly within the low torque range, a very high degree of softness in the rotary resilience with a progressive spring characteristic, grooves 8 along the outer periphery of metal rings 7 and engaging with the coaxial ribs 9 on sleeve 10 are preferably made of different dimensions so that, within the entire composite unit, the grooves increase in size in the peripheral direction in a staggered relation from one resilient element to the other or from one group to the other, each of which preferably consists of two or more individual elements. In order to transmit the entire rotary moment, the individual resilient members or groups of such members then engage one after the other as the torsion angle increases, so that the small rotary moments and particularly the alternating forces will be taken up only by one individual member or a group of such members of a high rotary resilience. After all members have been engaged one after the other, the entire rotary moment will then be taken up to the same extent as when the members are engaged in a parallel relation to each other.

The just described modification of our invention is illustrated in Fig. 2. Grooves 8 of metal ring 7h snugly accommodate the respective ribs 9 in outer sleeve 10. The grooves 8a of metal ring 7i are somewhat wider and thus permit a certain angular displacement of member 7i with respect to sleeve 10. The last metal ring 7k is formed with widest grooves 8b which permit even larger angular displacements of member 7k with respect to sleeve 10.

Similarly, the metal rings 4g, 4h, 4i are formed with progressively wider grooves 5, 5a, 5b, respectively, whereby the ring 4g is rotated as soon as the member 2 with ribs 3 is caused to rotate because the grooves 5 therein are of such width as to snugly receive the respective ribs 3. Rings 4h, 4i are positively engaged by rings 3 only after the member 2 has performed an angular movement of certain magnitude in the direction of arrow A with respect thereto. Ring 4h is positively entrained before the ring 4i. As an alternative, the width of grooves in rings 4g, 4i may be of equal magnitude, i.e. as shown at 5a or at 5b in Fig. 2.

As above stated, the provision of additional resilient annuli 19, 20 is advisable when the magnitude of grooves 5 and 8 varies from metal ring to metal ring or from one pair or group of metal rings to another pair or group. If all metal rings 4—4i and 7a—7k are formed with grooves 5, 8, respectively, of equal widths, the rings 4—4i are set in motion simultaneously by the ribs 3 of hollow shaft 2. As soon as the interposed resilient members 6 transmit rotation to metal discs or rings 7, the latter engage with ribs 9 and cause rotation of sleeve 10.

However, if the grooves 5 in the second metal ring 4a are somewhat wider than those in the first ring 4, the ring 4a will be entrained by ribs 3 of hollow shaft 2 only after the latter has performed a certain angular movement. On the other hand, if the grooves 5 in rings 4, 4a are of equal widths, both rings will be entrained simultaneously by the hollow shaft 2. When the grooves 5 are of equal widths in each of rings 4—4i, and the grooves 8 in all members 7a—7k, too, are of equal widths, such arrangement results in an assembly wherein the rings 4—4i and 7a—7k will be set in motion simultaneously by ribs 3 and by resilient members 6, respectively.

Rings 4, 4a may be formed with grooves 5 of equal width, and the grooves in rings 4b, 4c, too may be of equal width but wider than those formed in rings 4, 4a. The grooves in rings 4d, 4e may be still wider than those in rings 4b, 4c, and so forth. Rings 7a, 7b are then formed with equal grooves 8 of relatively small width, while the width of equal grooves in rings 7c, 7d is somewhat greater than that of grooves in rings 7a, 7b, and the width of equal grooves in rings 7e, 7f exceeds that of grooves in rings 7c, 7d. This arrangement results in a system in which the rings 4b, 4c are set in motion only after the rings 4, 4a have already performed a certain angular movement equal to the difference in the widths of their respective grooves, and the rings 4d, 4e are taken along only after the rings 4b, 4c, too, have performed an angular movement of given magnitude. The sequence in which the rings 7a, 7b; 7c, 7d; 7e, 7f; etc. are set in motion is analogous.

It is equally possible to form the rings 4—4i and 7a—7k with grooves 5 and 8, respectively, of progressively increased widths, i.e. as is shown in Fig. 2 in connection with rings 4g—4i (grooves 5—5b) and with rings 7h—7k (grooves 8—8b). Each ring is then entrained after the preceding ring has performed a certain angular movement with respect thereto. It is then advisable to provide additional resilient annuli 19 and 20, such as are shown in Fig. 4.

Such staggered relation has the advantage that the length of the entire unit will be still smaller and still greater torsion angles will be attainable. Although individual resilient elements when connected in parallel already considerably reduce the impact moments occurring in rigid drives, such elements when arranged in a staggered relation will absorb such moments almost completely. However, when using this type of arrangement, it should be noted that those individual elements which have to take up the largest torsion angle should also permit a greater extent of deformation, for example, by the provision of thicker rubber layers, than those elements which engage as the last. Naturally, this may also be carried out by providing several types of rubber of different degrees of resilience. A very marked progressiveness may be attained, for example, by providing two individual elements with a rubber layer calculated for a torsion angle of, for example, 30°, and to secure these elements radially along their outer periphery. Thus, after the first individual elements have reached a torsion angle of 15°, the next pair will engage, and this pair of elements will then be able to turn freely through the groove which has been enlarged to 15° until it reaches the end of this angle. The thickness of the rubber layer is then calculated to account for the residual torsion angle of 15° to be transmitted so that this pair of elements transmits the same rotary moment as the first elements. After a torsion angle of 20° has been reached, it is advisable if two pairs of elements then engage which have grooves which permit them to turn freely up to such angle. The thickness of the rubber layers is then calculated to account for the residual angle of 10° and to take up the same rotary moments as the preceding elements. With a complete unit of ten individual elements, the four last elements are designed and calculated to account for a residual torsion angle of 5°, in which case the grooves are enlarged to 25°. At a torsion angle of 30°, all individual elements are therefore in a staggered parallel relation to each other, and, although this is not absolutely required, each individual element may account for an equal rotary moment.

Fig. 7 shows several spring characteristics attained according to the invention, namely, a characteristic 27 which is typical for rotary thrust springs which are merely adapted to take up thrust, and which, at increasing torsion angles shows a slightly ascending progression but still an almost uniform rotary resilience within each torque range. Spring characteristics 28, 29, and 30, however, show curves of a strong progression when corrugated metal rings 22 and 23 according to Figs. 5 and 6 are being applied, so that, as the torsion angle increases, the specific rotary force to be taken up also increases. However, particularly if unsecured rubber and metal rings are interposed, this arrangement shows within the lower torque range a considerably greater softness in the direction of rotation. The course of curves 28, 29, and 30 is caused by interposing one, two, or three individual elements in series without securing the same radially, while for taking up the entire torque these groups are connected in parallel.

Fig. 8 illustrates a double-sleeve element consisting of an inner metallic sleeve 31 and an outer metallic sleeve 32, both of which are divided in the longitudinal direction into three parts. The longitudinal spaces or slots 33a, 33b between the parts of these sleeves receive rib-like projections 34 and 35 on a hollow shaft 36 and an outer sleeve 37, respectively, and sleeves 31, 32 are taken along by the latter in the same peripheral direction. Members 36 and 37 correspond to parts 2 and 10, respectively, shown in Fig. 1. The central metal sleeve 38 is covered on both sides by layers of resilient material 40, 41 and is provided with tooth-like or claw-like extensions 39 which engage in the axial direction with similar extensions on the ends of the adjacent elements so that all elements together then form a single unit. This central sleeve 38 turns in a direction in which the inner and outer metal sleeves 31, 32 rotate. Layers 40, 41 constitute thrust absorbing means and receive torque in a transverse plane from metallic members 31, 32, respectively.

Even though our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim as new is:

1. A tripartite resilient rotary connection between the joints of a universal shaft, comprising an intermediate hollow shaft, an inner shaft concentrically arranged along its entire length within the hollow shaft, an outer sleeve concentrically surrounding said hollow and said inner shafts nad fixedly secured to the iner shaft, resilient thrust absorbing means mounted between the hollow shaft and the outer sleeve, and pairs of metallic members for sub-dividing the resilient thrust absorbing means, said resilient means being mounted between the pairs of metallic members and said metallic members transmitting torque to the resilient means in a transverse plane.

2. A tripartite resilient rotary connection between the joints of a universal shaft, comprising an intermediate hollow shaft, an inner shaft concentrically arranged along its entire length within the hollow shaft, an outer sleeve concentrically surrounding said hollow and inner shafts and fixedly secured to the inner shaft, resilient thrust absorbing means mounted between the hollow shaft and the outer sleeve, and pairs of metal rings for axially sub-dividing the resilient thrust absorbing means, said resilient means being mounted between the pairs of metal rings and the metal rings transmitting torque to the resilient means in a transverse plane.

3. The resilient rotary connection of claim 2, comprising polyamide friction rings at the end faces of the resilient thrust absorbing means for producing a friction moment.

4. The resilient rotary connection of claim 2, wherein the metal rings adjacent the outer sleeve have grooves at their inner surface and the hollow shaft has rib-like projections, the grooves and the rib-like projections being angularly spaced so that upon a predetermined angular movement the rib-like projections engage the grooves and make the resilient connection rigid.

5. The resilient rotary connection of claim 2, wherein said metal rings are rotatable with the outer sleeve and the hollow shaft, respectively, and there are interposed between the pairs of metal rings loosely mounted rings which are freely rotatable.

6. The resilient rotary connection of claim 2, wherein the metal rings adjacent the outer sleeve have grooves of different dimensions and the outer sleeve has rib-like projections selectively engageable by said grooves upon increasing the torsional twist of the connection.

7. The resilient rotary connection of claim 2, comprising rubber friction rings at the end faces of the resilient thrust absorbing means for producing a friction moment.

8. A tripartite resilient rotary connection between the joints of a universal shaft, comprising an intermediate hollow shaft, an inner shaft concentrically arranged along its entire length within the hollow shaft, an outer sleeve concentrically surrounding said hollow and inner shafts and fixedly secured to the inner shaft, and a plurality of thrust absorbing means mounted between the hollow shaft and the outer sleeve along their axis, each thrust absorbing means comprising a pair of metal rings and a resilient rubber-like member mounted between the pair of metal rings, interlocking rib-like projections and grooves being provided for retaining the metal rings against rotation in relation to the hollow shaft and outer sleeve, respectively, whereby the metal rings move in relation to each other against the resilient resistance of the rubber-like members upon transmission of torque.

9. The resilient rotary connection of claim 8, wherein said thrust absorbing means is axially slidable and there is provided a tension nut for holding the thrust absorbing means under adjustable tension in the axial direction whereby the thrust absorbing means constitute a longitudinal spring, a pressure ring rigidly secured to the hollow shaft, and friction rings adjacent each end face of the pressure ring and receiving pressure from the longitudinal spring, the friction rings being retained by said rib-like projections against rotation in relation to the outer sleeve whereby rotation of the rubber-like members between the pressure ring and the friction rings produces a friction moment, the friction rings and the pressure ring rotating in opposite directions.

10. The resilient rotary connection of claim 8, wherein at least some of the rubber-like members have different deformation characteristics.

11. A tripartite resilient rotary connection between the joints of a universal shaft, comprising an intermediate hollow shaft, an inner shaft concentrically arranged along its entire length within the hollow shaft, an outer sleeve concentrically surrounding said hollow and inner shafts and fixedly secured to the inner shaft, and a plurality of thrust absorbing means mounted between the hollow shaft and the outer sleeve along their axis, each thrust absorbing means comprising a pair of metal rings having on their end faces radially extending angular surfaces and a rubber-like resilient disc mounted between the pair of metal rings, at least some of said metal rings being rotatable with the outer sleeve and the hollow shaft, respectively, whereby the initial thrust load develops progressively into a pressure load as the rotational angle increases.

12. A tripartite resilient rotary connection between the joints of a universal shaft, comprising an intermediate hollow shaft, an inner shaft concentrically arranged along its entire length within the hollow shaft, an outer sleeve concentrically surrounding said hollow and said inner shafts and fixedly secured to the inner shaft, an inner metal sleeve surrounding and connected to said hollow shaft, an outer metal sleeve in and connected to said first mentioned outer sleeve, a central metal sleeve concentrically arranged between said inner and said outer metal sleeves, said central sleeve having a plurality of axially arranged extensions, and resilient thrust absorbing means surrounding both sides of said central sleeve and in contact with said inner and outer metal sleeves, said inner and outer metal sleeves transmitting torque to said resilient means in a transverse plane.

References Cited in the file of this patent

UNITED STATES PATENTS

| | | |
|---|---|---|
| 2,174,223 | Frauenthal et al. | Sept. 26, 1939 |
| 2,620,165 | Crickmer | Dec. 2, 1952 |
| 2,691,283 | Stover | Oct. 12, 1954 |
| 2,790,312 | Habenlocher et al. | Apr. 30, 1957 |

FOREIGN PATENTS

| | | |
|---|---|---|
| 532,393 | Great Britain | Jan. 23, 1941 |